US012293728B2

(12) United States Patent
Zhu et al.

(10) Patent No.: US 12,293,728 B2
(45) Date of Patent: May 6, 2025

(54) DISPLAY APPARATUS AND METHOD FOR DRIVING THE SAME

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yuanzhang Zhu, Beijing (CN); Jian Li, Beijing (CN); Ting Han, Beijing (CN); Guoqiang Wu, Beijing (CN); Shuai Hou, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/250,152

(22) PCT Filed: Mar. 30, 2022

(86) PCT No.: PCT/CN2022/084208
§ 371 (c)(1),
(2) Date: Apr. 21, 2023

(87) PCT Pub. No.: WO2023/184279
PCT Pub. Date: Oct. 5, 2023

(65) Prior Publication Data
US 2024/0379066 A1 Nov. 14, 2024

(51) Int. Cl.
*G09G 3/3275* (2016.01)
*G09G 3/32* (2016.01)
*G09G 3/3266* (2016.01)

(52) U.S. Cl.
CPC ............ *G09G 3/3275* (2013.01); *G09G 3/32* (2013.01); *G09G 3/3266* (2013.01);
(Continued)

(58) Field of Classification Search
CPC ...... G09G 3/3275; G09G 3/32; G09G 3/3266; G09G 2310/0267; G09G 2310/0275;
(Continued)

(56) References Cited

U.S. PATENT DOCUMENTS 9,373,298 B2 * 6/2016 Shin .................... G09G 3/3614
2007/0195052 A1 * 8/2007 Oh ...................... G09G 3/3688
345/100

(Continued)

*Primary Examiner* — David Tung
(74) *Attorney, Agent, or Firm* — IP & T GROUP LLP

(57) ABSTRACT

A method for driving a display apparatus includes: in a first refresh period which corresponds to a first refresh rate and includes a first effective phase and first ineffective phase(s), outputting a first image frame signal to a display panel of the display apparatus in the first effective phase, and outputting a first ineffective data signal to the display panel in a first ineffective phase; and in a second refresh period which corresponds to a second refresh rate and includes a second effective phase and second ineffective phase(s), outputting a second image frame signal to the display panel in the second effective phase, and outputting a second ineffective data signal to the display panel in a second ineffective phase. The first refresh rate is different from the second refresh rate, and the first ineffective data signal and the second ineffective data signal have different magnitudes in voltage.

18 Claims, 4 Drawing Sheets

(52) U.S. Cl.
CPC ............... *G09G 2310/0267* (2013.01); *G09G 2310/0275* (2013.01); *G09G 2310/08* (2013.01); *G09G 2320/0247* (2013.01); *G09G 2330/021* (2013.01)

(58) Field of Classification Search
CPC ....... G09G 2310/08; G09G 2320/0247; G09G 2330/021
See application file for complete search history.

(56) References Cited

U.S. PATENT DOCUMENTS

| | | | | |
|---|---|---|---|---|
| 2016/0125798 | A1* | 5/2016 | Park | G09G 3/3233 345/204 |
| 2019/0228733 | A1* | 7/2019 | Koo | G09G 3/3655 |
| 2020/0082760 | A1* | 3/2020 | Ogata | G09G 3/3258 |
| 2020/0365677 | A1* | 11/2020 | Yun | G09G 3/3275 |
| 2021/0248958 | A1* | 8/2021 | Park | G09G 3/3275 |
| 2022/0139349 | A1* | 5/2022 | Park | G09G 3/3688 345/87 |
| 2023/0096537 | A1* | 3/2023 | Lim | G09G 3/3233 345/212 |

* cited by examiner

DISPLAY APPARATUS AND METHOD FOR DRIVING THE SAME

CROSS-REFERENCE TO RELATED APPLICATION

This application is a national phase entry under 35 USC 371 of International Patent Application No. PCT/CN2022/084208, filed on Mar. 30, 2022, which is incorporated herein by reference in its entirety.

TECHNICAL FIELD

The present disclosure relates to the field of display technologies, and in particular, to a display apparatus and a method for driving the same.

BACKGROUND

There are various types of display apparatuses. According to display media and operation principles, the display apparatuses may be classified into liquid crystal display (LCD) apparatuses, inorganic electroluminescent display (ELD) apparatuses, organic electroluminescent display apparatuses, and other types. Each type of display apparatuses may be applied to various scenarios to meet different image display requirements. With the continuous development of display technologies, users' requirements for the display effect of the display apparatus gradually increase.

SUMMARY

In an aspect, a method for driving a display apparatus is provided. The method for driving the display apparatus includes: in a first refresh period that corresponds to a first refresh rate and includes a first effective phase and at least one first ineffective phase, outputting a first image frame signal to a display panel of the display apparatus in the first effective phase, and outputting a first ineffective data signal to the display panel in a first ineffective phase; and in a second refresh period that corresponds to a second refresh rate and includes a second effective phase and at least one second ineffective phase, outputting a second image frame signal to the display panel in the second effective phase, and outputting a second ineffective data signal to the display panel in a second ineffective phase. The first refresh rate is different from the second refresh rate, and the first ineffective data signal and the second ineffective data signal have different magnitudes in voltage.

In some embodiments, the first refresh rate is less than the second refresh rate; the first refresh period includes at least two first frame periods, and a first first frame period in the at least two first frame periods is a first writing frame; and the first effective phase is included in the first writing frame.

In some embodiments, each first frame period in the at least two first frame periods other than the first writing frame is a first holding frame. The first holding frame includes a first display control phase and a first free phase, a position of the first display control phase in the first holding frame and a position of the first effective phase in the first writing frame are same; the first free phase is between the first display control phase and the first writing frame, and the first free phase is one of the at least one first ineffective phase.

In some embodiments, the first ineffective data signal is output to the display panel in the first display control phase.

In some embodiments, a high impedance state is output to the display panel in the first display control phase.

In some embodiments, the first holding frame further includes a second free phase; the second free phase is after the first display control phase, and the second free phase is one of the at least one first ineffective phase.

In some embodiments, the first writing frame further includes a third free phase, the third free phase is between the first effective phase and the first holding frame, and the third free phase is one of the at least one first ineffective phase.

In some embodiments, the method for driving the display apparatus further includes: in the first effective phase, outputting a first scan signal to a row of sub-pixels in the display panel, and outputting a second scan signal and a third scan signal to the row of sub-pixels in the display panel in sequence, a phase in which the second scan signal is at an effective voltage and a phase in which the third scan signal is at an effective voltage being both within a phase in which the first scan signal is at an effective voltage; and in the first free phase, outputting the second scan signal and the third scan signal to the row of sub-pixels in the display panel in sequence.

In some embodiments, the second refresh period includes at least two second frame periods, and a first second frame period in the at least two second frame periods is a second writing frame; and the second effective phase is included in the second writing frame.

In some embodiments, the second refresh period includes one second frame period.

In some embodiments, the display apparatus includes at least three different refresh rates, and the first refresh rate and the second refresh rate are included in the at least three different refresh rates; an absolute value of a difference between a voltage of the first ineffective data signal and a voltage of the second ineffective data signal is positively correlated with an absolute value of a difference between the first refresh rate and the second refresh rate.

In some embodiments, the first refresh rate is less than the second refresh rate; and a voltage of the first ineffective data signal is less than a voltage of the second ineffective data signal.

In another aspect, a display apparatus is provided. The display apparatus includes a display panel and a data driver. The display panel is configured to display an image frame. The data driver is configured to: in a first refresh period that corresponds to a first refresh rate and includes a first effective phase and at least one first ineffective phase, output a first image frame signal to the display panel in the first effective phase, and output a first ineffective data signal to the display panel in a first ineffective phase; and in a second refresh period that corresponds to a second refresh rate and includes a second effective phase and at least one second ineffective phase, output a second image frame signal to the display panel in the second effective phase, and output a second ineffective data signal to the display panel in a second ineffective phase. The first refresh rate is different from the second refresh rate, and the first ineffective data signal and the second ineffective data signal have different magnitudes in voltage.

In some embodiments, the first refresh rate is less than the second refresh rate, the first refresh period includes at least two first frame periods, a first first frame period in the at least two first frame periods is a first writing frame, and the first effective phase is included in the first writing frame; each first frame period in the at least two first frame periods other than the first writing frame is a first holding frame, the first holding frame includes a first display control phase and a first free phase, a position of the first display control phase in the first holding frame and a position of the first effective phase in the first writing frame are same; the first free phase is located between the first display control phase and the first writing frame, and the first free phase is one of the at least one first ineffective phase. The display apparatus further includes a scan driver, and the scan driver is configured to: in the first effective phase, output a first scan signal to a row of sub-pixels in the display panel, and output a second scan signal and a third scan signal to the row of sub-pixels in the display panel in sequence, a phase in which the second scan signal is at an effective voltage and a phase in which the third scan signal is at an effective voltage are both within a phase in which the first scan signal is at an effective voltage; and in the first free phase, output the second scan signal and the third scan signal to the row of sub-pixels in the display panel in sequence.

In some embodiments, the display panel includes a plurality of data lines and a plurality of pixel circuits, and a data line in the plurality of data lines is coupled to both the data driver and a pixel circuit in the plurality of pixel circuits. The pixel circuit includes a plurality of transistors, the plurality of transistors include a driving transistor and a first transistor, and the first transistor is coupled to both the data line and the driving transistor. The first transistor is a low-temperature polysilicon transistor.

In some embodiments, each transistor includes a control electrode, a first electrode and a second electrode, and the first electrode and the second electrode are connected under control of the control electrode. The plurality of transistors further include a second transistor and a third transistor; a first electrode and a second electrode of the second transistor are both connected to the driving transistor, and the third transistor is connected to both a control electrode of the driving transistor and the second transistor, and the third transistor is connected to both a control electrode of the driving transistor and the second transistor. The third transistor is an oxide transistor.

In some embodiments, the third transistor includes an active pattern, and further includes a first gate and a second gate; the first gate and the second gate are located on different sides of the active pattern in a thickness direction of the display apparatus, and are both insulated from the active pattern.

In some embodiments, the first writing frame further includes a fourth free phase, the fourth free phase is before the first effective phase, and the fourth free phase is one of the at least one first ineffective phase.

In some embodiments, the method for driving the display apparatus further includes: in the fourth free phase, outputting a reset scan signal to a row of sub-pixels in the display panel; and in the first effective phase, outputting an effective voltage of a first scan signal to the row of sub-pixels in the display panel, and outputting effective voltages corresponding to a second scan signal and a third scan signal to the row of sub-pixels in the display panel in sequence; a phase in which the second scan signal is at an effective voltage and a phase in which the third scan signal is at an effective voltage being both within a phase in which the first scan signal is at an effective voltage.

In some embodiments, the second writing frame further includes a fifth free phase and a sixth free phase; the fifth free phase is before the second effective phase, and the sixth free phase is after the second effective phase; the fifth free phase is one of the at least one second ineffective phase, and the sixth free phase is also one of the at least one second ineffective phase. Each second frame period in the at least two second frame periods other than the second writing frame is a second holding frame. The second holding frame includes a second display control phase, a seventh free phase and an eighth free phase; the second display control phase is between the seventh free phase and the eighth free phase; the seventh free phase is one of the at least one second ineffective phase, and the eighth free phase is also one of the at least one second ineffective phase.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these accompanying drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figure 1:
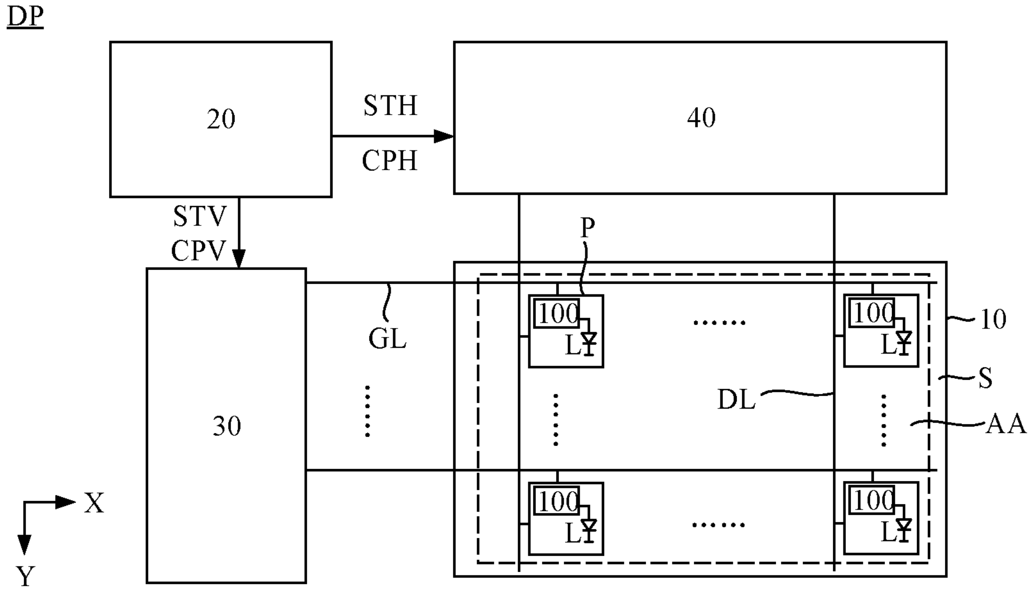
FIG. 1 is a structural diagram of a display apparatus, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the terms "a plurality of", "the plurality of" and "multiple" each mean two or more unless otherwise specified.

In the description of some embodiments, terms such as "coupled" and "connected" and derivatives thereof may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, depending on the context, the term "if" is optionally construed as "when", "in a case where", "in response to determining" or "in response to detecting". Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The phrase "applicable to" or "configured to" used herein means an open and inclusive expression, which does not exclude devices that are applicable to or configured to perform additional tasks or steps.

As used herein, the terms such as "parallel", "perpendicular" or "equal" include a stated condition and a condition similar to the stated condition. A range of the similar condition is within an acceptable range of deviation, and the acceptable range of deviation is determined by a person of ordinary skill in the art in view of measurement in question and errors associated with measurement of a particular quantity (i.e., the limitation of the measurement system). For example, the term "parallel" includes absolute parallelism and approximate parallelism, and an acceptable range of deviation of the approximate parallelism may be, for example, a deviation within 5°. The term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of the approximate equality may be, for example, a difference between two equals being less than or equal to 5% of either of the two equals.

Exemplary embodiments are described herein with reference to sectional views and/or plan views as idealized exemplary drawings. In the drawings, thicknesses of layers and sizes of regions are enlarged for clarity. Variations in shape relative to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown to have a rectangular shape generally has a feature of being curved. Therefore, the regions shown in the accompanying drawings are schematic in nature, and their shapes are not intended to show actual shapes of regions in an apparatus, and are not intended to limit the scope of the exemplary embodiments.

Some embodiments of the present disclosure provide a display apparatus. For example, the display apparatus may be a display, a television, a billboard, a home appliance, a large area wall, an information query device (e.g., a business inquiry device of departments such as an electronic government department, a bank, a hospital or an electric power department), a cellphone, a personal digital assistant (PDA), a digital camera, a camcorder, or a navigator.

Referring to FIG. 1, the display apparatus DP includes a display panel 10, and the display panel 10 is configured to display an image frame. The display panel 10 may be an organic light-emitting diode (OLED) panel, a quantum dot light-emitting diode (QLED) panel, a liquid crystal display (LCD) panel or a tiny light-emitting diode (a tiny LED, including mini-LED or micro-LED) panel, which is not limited here.

For example, referring to FIG. 1, the display panel 10 has a display area AA and a peripheral area S. The peripheral region S is located on at least one side of the display area AA. For example, the peripheral area S may be disposed around the display area AA. The display panel 10 may include a plurality of sub-pixels P, and the plurality of sub-pixels P are located in the display area AA. For example, the plurality of sub-pixels P may be arranged in an array. For example, sub-pixels P arranged in a line along a first direction X are referred to as sub-pixels in a same row, and sub-pixels P arranged in a line along a second direction Y are referred to as sub-pixels in a same column. The plurality of sub-pixels P may include sub-pixels of a first color configured to emit light of the first color, sub-pixels of a second color configured to emit light of the second color, and sub-pixels of a third color configured to emit light of the third color. For example, the first color, the second color and the third color are red, green and blue, respectively. The first direction X intersects the second direction Y. For example, the first direction X may be perpendicular to the second direction Y.

Referring to FIG. 1, the display apparatus DP may further include at least one timing controller 20 (e.g., one timing controller 20), at least one scan driver 30 (e.g., one scan driver 30), and at least one data driver 40 (e.g., one data driver 40). Each scan driver 30 is coupled to a timing controller 20, and each data driver 40 is also coupled to a timing controller 20. The numbers of timing controllers 20, scan drivers 30 and data drivers 40 may be set according to a resolution of the display apparatus DP, the higher the resolution of the display apparatus DP is, the larger the numbers of timing controllers 20, scan drivers 30 and data drivers 40 may be correspondingly increased, which is not limited in the present disclosure. The scan driver 30 is configured to receive a plurality of scan control signals (such as a start vertical (STV) signal indicating a start of scanning for the image frame, and a clock pulse vertical (CPV) signal indicating a line scanning being turned on) from the timing controller 20, and output respective scan signals (such as a first scan signal, a second scan signal and a third scan signal) to the display panel 10 in response to the received scan control signals. The data driver 40 is configured to receive a plurality of data control signals (such as a clock pulse horizontal (CPH) signal, a start horizontal (STH) signal indicating a start of data transmission of a line) from the timing controller 20, and output a corresponding image frame signal to the display panel 10 in response to the received data control signals. The image frame signal includes a plurality of data voltages corresponding to the image frame. Each sub-pixel P is driven by the data voltage to display a corresponding grayscale.

For example, with continued reference to FIG. 1, the display panel 10 may further include a plurality of signal lines, and the signal lines may be gate lines GL, data lines DL, power supply voltage lines (not shown in the figure), or the like. For example, in a case where the signal lines are the gate lines GL, the signal line may extend along the first direction X and be coupled to a row of sub-pixels, and control sub-pixels in the row to be turned on and off. In a case where the signal lines are the data lines DL, the signal line may extend along the second direction Y and be couple to a column of sub-pixels, and provide the data voltage to each sub-pixel P in the column. In a case where the signal lines are power supply voltage lines, the signal line may extend along the second direction Y and be couple to sub-pixels in at least one column, and provide a power supply voltage (e.g., a high-level voltage) to sub-pixels in a corresponding column.

For example, referring to FIG. 1, at least one sub-pixel P (e.g., each sub-pixel P) of the display panel 10 includes a pixel circuit 100 and a light-emitting device L. Each pixel circuit 100 is coupled to a light-emitting device L, and the pixel circuit 100 is configured to drive the light-emitting device L to emit light. A plurality of pixel circuits 100 are included in the display panel 10. For example, the plurality of pixel circuits 100 are also arranged in an array, and a position of a sub-pixel P including a pixel circuit 100 serves as a position of the pixel circuit 100.

Different types of display panels use different types of light-emitting devices L. For example, the light-emitting device L may be an LED, an OLED, or a QLED. The light-emitting device L may include a cathode and an anode, and a light-emitting functional layer located between the cathode and the anode. The light-emitting functional layer may include an emitting layer (EML), a hole transport layer (HTL) located between the emitting layer and the anode, and an electron transport layer (ETL) located between the emitting layer and the cathode. Of course, in some embodiments, according to needs, a hole injection layer (HIL) may further be provided between the hole transport layer and the anode, and an electron injection layer (EIL) may further be provided between the electron transport layer and the cathode. For convenience of description, the following description will be made by considering an example in which the display panel 10 is the OLED panel, and the light-emitting device L is the OLED.

A specific structure of the pixel circuit may be designed according to actual situations, and is not limited in embodiments of the present disclosure. For example, each pixel circuit includes at least one capacitor and a plurality of transistors. For example, the pixel circuit may include two transistors (a switching transistor and a driving transistor) and one capacitor, which constitute a 2T1C structure; or the pixel circuit may include more than two transistors (a plurality of switching transistors and the driving transistor) and at least one capacitor. The transistor may be a thin film transistor (TFT), or may be a field effect transistor (FET). The plurality of transistors included in the pixel circuit may be low-temperature polycrystalline silicon (LTPS) transistors, or oxide transistors. The plurality of transistors may also include the low-temperature polycrystalline silicon transistor and the oxide transistor.

For example, each transistor includes a control electrode, a first electrode and a second electrode. The first electrode and the second electrode are connected under control of the control electrode. For example, in a case where the transistor is the thin film transistor or the field effect transistor, the control electrode may be a gate of the transistor, the first electrode may be a source of the transistor, and the second electrode may be a drain of the transistor; the source and the drain may be connected under control of the gate. In a case where the transistor is a P-type transistor (e.g., the low-temperature polycrystalline silicon transistor), a current flows from the source to the drain of the transistor when the transistor is turned on. In a case where the transistor is an N-type transistor (e.g., the oxide transistor), a current flows from the drain to the source of the transistor when the transistor is turned on.

Figure 2:
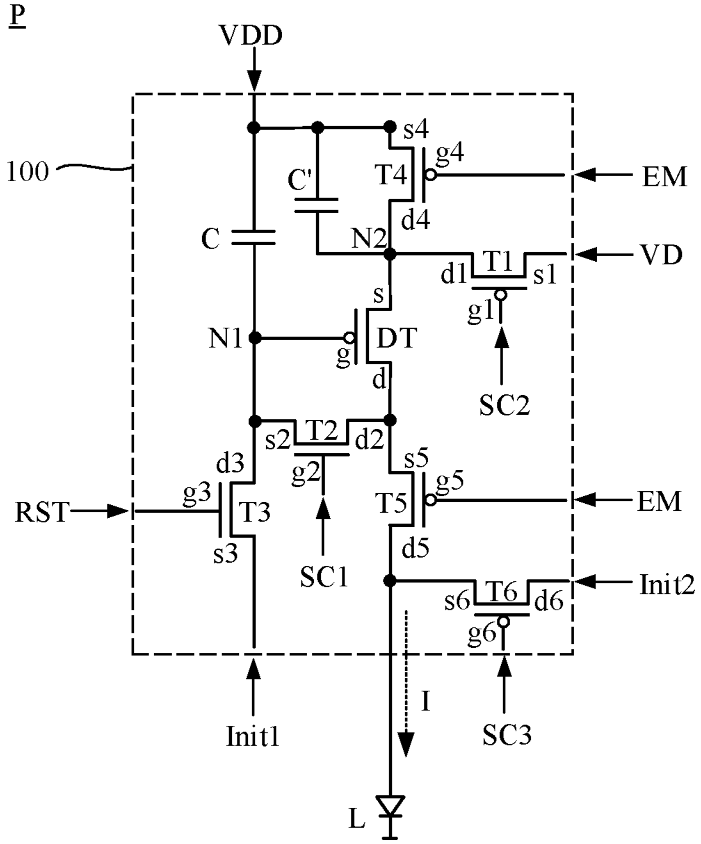
FIG. 2 is an equivalent circuit diagram of a pixel circuit, in accordance with some embodiments.

Referring to FIG. 2, considering an example in which the pixel circuit 100 has a 7T1C structure constituted by one capacitor and seven transistors for description. The pixel circuit 100 includes one storage capacitor C, and further includes one driving transistor DT and six switching transistors. The six switching transistors are a first transistor T1, a second transistor T2, a third transistor T3, a fourth transistor T4, a fifth transistor T5, and a sixth transistor T6. For example, the second transistor T2 and the third transistor T3 are both oxide transistors; the driving transistor DT, the first transistor T1 and the fourth transistor T4 to the sixth transistor T6 are all low-temperature polycrystalline silicon transistors. The low-temperature polycrystalline silicon transistor has a rapid response, a relatively small size, and a relatively high mobility. Therefore, multiple transistors of the pixel circuit 100 are provided as low-temperature polycrystalline silicon transistors, which helps shorten a response time of the pixel circuit 100, and helps reduce of an overall size of the pixel circuit 100, thereby helping achieve a high resolution of the display apparatus.

A control electrode g1 of the first transistor T1 is used to receive the second scan signal SC2, a first electrode s1 of the first transistor T1 is used to receive the data voltage VD, and a second electrode d1 of the first transistor T1 is connected to a first electrode of the driving transistor DT (the first electrode of the driving transistor DT being connected to an N2 node). A control electrode g2 of the second transistor T2 is used to receive the first scan signal SC1, a first electrode S2 and a second electrode d2 of the second transistor T2 are both connected to the driving transistor DT. The first electrode S2 is connected to a control electrode g of the driving transistor DT (the control electrode g of the driving transistor DT being connected to an N1 node), and the second electrode d2 is connected to a second electrode d of the driving transistor DT. A control electrode g3 of the third transistor T3 is used to receive a reset scan signal RST, a first electrode s3 of the third transistor T3 is used to receive a first initialization signal Init1, and a second electrode d3 of the third transistor T3 is connected to both the control electrode g of the driving transistor DT and the first electrode S2 of the second transistor T2. A control electrode g4 of the fourth transistor T4 is used to receive a light-emitting control signal EM, a first electrode s4 of the fourth transistor T4 is used to receive the power supply voltage VDD, and a second electrode d4 of the fourth transistor T4 is connected to both a first electrode s of the driving transistor DT and the first electrode s1 of the first transistor T1. A control electrode g5 of the fifth transistor T5 is used to receive the light-emitting control signal EM, a first electrode s5 of the fifth transistor T5 is connected to both the second electrode d of the driving transistor DT and the second electrode d2 of the second transistor T2, and a second electrode d5 of the fifth transistor T5 is coupled to the anode of the light-emitting device L. A control electrode g6 of the sixth transistor T6 is used to receive the third scan signal SC3, a first electrode s6 of the sixth transistor T6 is connected to the second electrode d5 of the fifth transistor T5 and is coupled to the anode of the light-emitting device L, and a second electrode d6 of the sixth transistor T6 is used to receive a second initialization signal Init2. An electrode plate of the storage capacitor C is connected to the second electrode d3 of the third transistor T3, and another electrode plate of the storage capacitor C is connected to the first electrode s4 of the fourth transistor T4. For the scan signals (e.g., the first scan signal SC1 to the third scan signal SC3, and the reset scan signal RST), a voltage of the scan signal received by a transistor enables the transistor to be turned on, and the voltage is an effective voltage of the scan signal.

Figure 3:
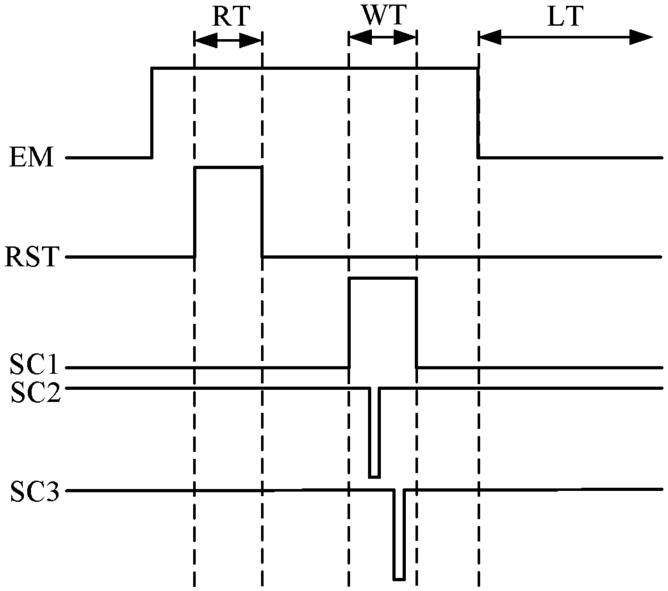
FIG. 3 is a driving timing diagram of a pixel circuit, in accordance with some embodiments.

Referring to FIGS. 2 and 3, a driving process of the pixel circuit 100 includes a reset phase RT, a writing phase WT and a light-emitting phase LT.

In the reset phase RT, the third transistor T3 is turned on in response to the reset scan signal RST, so that the first initialization signal Init1 is transmitted to the control electrode g of the driving transistor DT and the storage capacitor C through the third transistor T3. As a result, the control electrode g of the driving transistor DT and the storage capacitor C are reset.

In the writing phase WT, the second transistor T2 is turned on in response to the first scan signal SC1, the control electrode g is coupled to the second electrode d of the driving transistor DT, the first transistor T1 is turned on in response to the second scan signal SC2; a compensation signal constituted by the data voltage VD and a threshold voltage of the driving transistor DT is transmitted to the control electrode g of the driving transistor DT, so that the driving transistor DT is turned on; at the same time, the compensation signal is written into the storage capacitor C. Next, the first transistor T1 is turned off, the sixth transistor T6 is turned on in response to the third scan signal SC3, so that the second initialization signal Init2 is transmitted to the anode of the light-emitting device L through the sixth transistor T6. As a result, the anode of the light-emitting device L is reset. Then, the second transistor T2 is turned off.

In the light-emitting phase LT, the fourth transistor T4 and the fifth transistor T5 are turned on in response to the light-emitting control signal EM. In this phase, the storage capacitor C continuously supplies power to the driving transistor DT, and thus the driving transistor DT remains turned on. A current path is formed between the driving transistor DT, the fourth transistor T4 and the fifth transistor T5, so that the light-emitting device L is driven by a driving current I to emit light.

The display apparatus generally needs to continuously perform display during use, so as to enhance the users' experience and the competitiveness of a product. How to reduce the power consumption and improve the endurance of the display apparatus has become a problem that must be considered. The power consumption of the display apparatus is positively correlated with a refresh rate (which may also be referred to as a refresh frequency), and the greater the refresh rate, the greater the power consumption of the display apparatus. The refresh rate refers to a frequency at which the image frame displayed on the display panel is refreshed. That is, the refresh rate refers to a frequency at which the data driver of the display apparatus outputs the image frame signal to the display panel. In order to reduce the power consumption of the display apparatus, the refresh rate may be reduced when the display apparatus is in a standby state or some special pictures (such as static pictures) are displayed. Further, in order to balance the power consumption and the display effect of the display apparatus, the display apparatus may have multiple refresh rates, and different refresh rates are applicable to different display scenarios. For example, the highest refresh rate of the display apparatus is 120 Hz, refresh rates of 60 Hz and 30 Hz may also be implemented by the display apparatus. In a case where the user watches a movie on the display apparatus or uses the display apparatus to display game pictures, the refresh rate of the display apparatus is 120 Hz; in a case where the user uses the display apparatus to view content such as a document or a photo, the refresh rate of the display apparatus is 60 Hz; and in a case where the display apparatus is set to be in the standby state by the user, the refresh rate is 30 Hz.

It will be noted that, in the case where the display apparatus has multiple refresh rates, a high refresh rate and a low refresh rate are relative, and are not divided according to specific value ranges. In any two refresh rates that can be implemented by the display apparatus, a larger refresh rate is the high refresh rate, and the other one is the low refresh rate.

A start moment of the image frame is a moment (referred to as a first moment below) at which the scan driver starts to receive the STV signal corresponding to the image frame, and an end moment of the image frame is a moment (referred to as a second moment below) at which the scan driver starts to receive an STV signal corresponding to a next image frame. An interval between the second moment and the first moment is a frame period.

For example, the refresh rate may be changed by changing the frame period. A frame period at the high refresh rate is shorter than a frame period at the low refresh rate. Regardless of the high refresh rate or the low refresh rate, in each frame period, the data driver outputs the image frame signal corresponding to the image frame to the display panel. The frame period can be changed by changing the timing (referred to as a timing group below) associated with the frame period. That is, the frame period can be changed by changing the duration (or referred to as a pulse width) of the effective voltage in at least one signal (which may be at least one signal (e.g., one signal) in the first scan signal to the third scan signal, the reset scan signal, the light-emitting control signal, etc.) associated with the frame period. The number of timing groups that is needed by the display apparatus is the same as the number of refresh rates that can be implemented by the display apparatus. In a case where a refresh rate switches, a corresponding timing group also needs to switch, so that the refresh rates match the timings. For example, in a case where the refresh rates of 60 Hz and 90 Hz may be implemented by the display apparatus, a timing group corresponding to the refresh rate of 60 Hz and a timing group corresponding to the refresh rate of 90 Hz are needed. A pulse width of at least one signal in the timing group corresponding to the refresh rate of 60 Hz is different from a pulse width of the at least one signal in the timing group corresponding to the refresh rate of 90 Hz. For example, the pulse width of the first scan signal in the timing group corresponding to the refresh rate of 60 Hz may be greater than the pulse width of the first scan signal in the timing group corresponding to the refresh rate of 90 Hz.

As another example, the refresh rate may be changed by changing an output frequency of the image frame signal without changing the frame period. That is, different refresh rates are implemented in a frame interpolation manner. In this way, the timing has a relatively small change degree, which can reduce the difficulty of the timing design. In this case, the frame period at the high refresh rate is equal to the frame period at the low refresh rate, pulse widths of each signal in a timing group corresponding to the high refresh rate and in a timing group corresponding to the low refresh rate are equal. An output frequency of the scan signal at the high refresh rate may be equal to an output frequency of the scan signal at the low refresh rate, and the output frequency of the image frame signal at the high refresh rate is greater than the output frequency of the image frame signal at the low refresh rate. For example, the display apparatus may implement two refresh rates of 120 Hz and 60 Hz. In a case where the refresh rate is 120 Hz, in each frame period, the scan driver outputs the scan signal corresponding to the image frame to the display panel, and the data driver outputs the image frame signal corresponding to the image frame to the display panel; output frequencies of signals from the scan driver and the data driver are both 120 Hz. In a case where the refresh rate is 60 Hz, in a first frame period, the scan driver outputs the scan signal corresponding to the image frame to the display panel, and the data driver outputs the image frame signal corresponding to the image frame to the display panel; in a second frame period, the scan driver outputs the scan signal corresponding to the image frame to the display panel, and no image frame signal is output from the data driver. The first frame period is adjacent to the second frame period; the output frequency of the signal from the scan driver is 120 Hz, and the output frequency of the signal from the data driver is 60 Hz.

A frame period in which the data driver outputs the image frame signal to the display panel is referred to as a writing frame. In the writing frame, a moment at which the scan driver starts to receive the STV signal corresponding to the image frame is the start moment, and an interval between start moments in two adjacent writing frames is a refresh period. Different refresh rates correspond to different refresh periods. A refresh period corresponding to the high refresh rate is smaller than a refresh period corresponding to the low refresh rate. A refresh period includes at least one frame period (e.g., one or a plurality of frame periods), and the image content displayed by the display apparatus in the refresh period is the same. In addition, if there is no image frame signal output from the data driver to the display panel in a frame period, the frame period is referred to as a holding frame.

Figure 4:
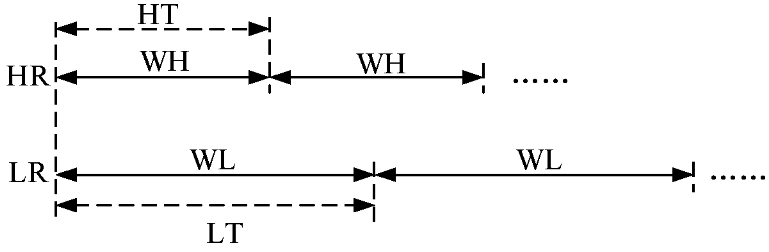
FIG. 4 is a schematic diagram illustrating an implementation of different refresh rates, in accordance with some embodiments.

In combination with the description above, referring to FIG. 4, when the refresh rate is changed by changing the frame period, whether at the high refresh rate HR or the low refresh rate LR, each refresh period includes only one frame period, and each frame period is a writing frame. In each frame period, the display panel receives an image frame signal corresponding to the frame. The writing frame WL at the low refresh rate LR is greater than the writing frame WH at the high refresh rate HR. Correspondingly, the refresh period LT at the low refresh rate LR is greater than the refresh period HT at the high refresh rate HR.

Figure 5:
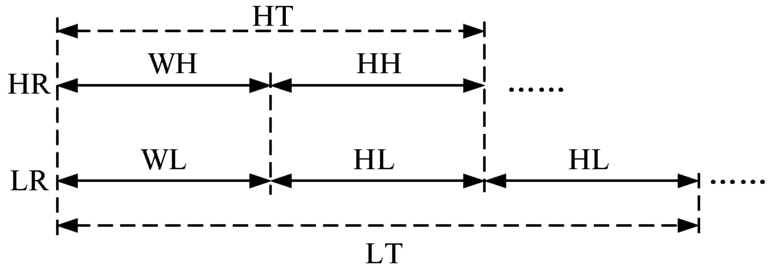
FIG. 5 is a schematic diagram illustrating an implementation of different refresh rates, in accordance with some other embodiments.

When the refresh rate is changed in the frame interpolation manner, referring to FIG. 5, each refresh period HT may include only one writing frame WH at the high refresh rate HR; or each refresh period HT may include at least two (e.g., two) frame periods at the high refresh rate HR, and in the frame periods, a first frame period is the writing frame WH, and other frame period(s) are holding frame(s) HH. Each refresh period LT includes a plurality of frame periods at the low refresh rate LR, and in the plurality of frame periods, a first frame period is the writing frame WL, and other frame period(s) are holding frame(s) HL. The number of frame periods included in the refresh period LT at the low refresh rate LR is greater than the number of frame periods included in the refresh period HT at the high refresh rate HR, so that the refresh period LT at the low refresh rate LR is greater than the refresh period HT at the high refresh rate HR. For example, the refresh period HT at the high refresh rate HR includes two frame periods, and in the two frame periods, one is the writing frame WH, and the other one is the holding frame HH; the refresh period LT at the low refresh rate LR includes three frame periods, and in the three frame periods, one is the writing frame WL, and another two are holding frames HL. The refresh period LT is greater than the refresh period HT.

In the writing frame of the refresh period, the data driver outputs the image frame signal to the display panel, a corresponding compensation signal is written into the storage capacitor in each pixel circuit; and in the writing frame, when each pixel circuit is in the light-emitting phase, the storage capacitor continuously supplies power to the driving transistor, so that the light-emitting device is maintained to emit light. The compensation signal on each storage capacitor is not updated until a writing frame of a next refresh period. The greater the refresh period, the longer the storage capacitor needs to be powered.

Figure 6:
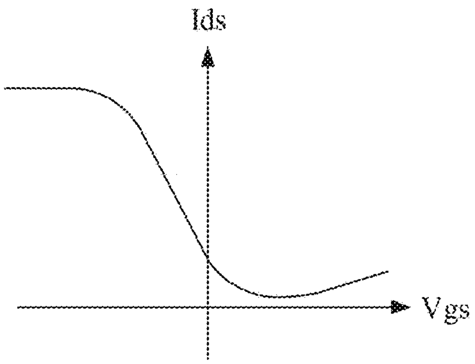
FIG. 6 is a transfer characteristic curve of a P-type transistor, in accordance with some embodiments.

Referring to FIGS. 2 and 3, in the light-emitting phase LT, the fourth transistor T4 and the fifth transistor T5 are in the turned-on state; the storage capacitor C continuously supplies power to the driving transistor DT, and thus the driving transistor DT is also maintained at the turned-on state. At this time, other transistors in the pixel circuit 100 should be turned off. However, the transistor cannot be completely turned off due to a leakage current at the transistor, and the transistor is still weakly turned on. Since the leakage current exists, the third transistor T3 is weakly turned on. As a result, the potential at the N1 node is gradually reduced due to the influence of the first initialization signal Init1. That is, the voltage at the control electrode g of the driving transistor DT is gradually reduced. In addition, the output current of the driving transistor DT and the luminance of the light-emitting device L are finally changed (getting larger or smaller). In the case where the compensation signal on each storage capacitor C is not updated, the greater the refresh period is, the longer the storage capacitor C needs to be powered, and the greater the luminance variation of the light-emitting device L is. Referring to FIGS. 2 and 6, the driving transistor DT is the P-type transistor, the potential at the N1 node is reduced, and thus a gate-source voltage difference Vgs (i.e., a voltage difference between the control electrode g and the first electrode s) of the driving transistor DT is reduced. It can be seen from the transfer characteristic curve of the P-type transistor that, as the gate-source voltage difference Vgs is reduced, the current Ids output from the driving transistor DT becomes larger. Correspondingly, the luminance of the light-emitting device L also becomes larger. Therefore, as described above, with continued reference to FIG. 2, the third transistor T3 may be set as the oxide transistor. Since the oxide transistor has a relatively low electron mobility and a relatively small leakage current, the decrease of the potential at the N1 node in the light-emitting phase can be reduced, which can extend the duration of the storage capacitor C for continuously supplying power. As a result, it helps achieve a lower refresh rate, and further reduces power consumption. In addition, the luminance of the light-emitting device L can be well maintained in the light-emitting phase, which helps improve the display effect.

In combination with the description above, the refresh period at the low refresh rate is greater than the refresh period at the high refresh rate, and a time interval for updating the compensation signal on the storage capacitor at the low refresh rate is greater than a time interval for updating the compensation signal on the storage capacitor at the high refresh rate. As a result, the luminance variation of the light-emitting device at the low refresh rate is greater, and the display flicker is more serious.

Each frame period may include a first phase, a second phase, and a third phase at either the high refresh rate or the low refresh rate. A start moment of the first phase is a moment at which the scan driver starts to receive the STV signal corresponding to the image frame. When the first phase ends, the second phase starts. An end moment of the first phase (i.e., a start moment of the second phase) is a moment at which the data driver starts outputting the image frame data of the image frame to the display panel. When the second phase ends, the third phase starts. An end moment of the second phase (i.e., a start moment of the third phase) is a moment at which the data driver finishes outputting the image frame data of the image frame, and an end moment of the third phase is a moment at which the scan driver starts to receive the STV signal corresponding to the next image frame. In the third phase, each pixel circuit in the display panel is in the light-emitting phase; in the first phase and the third phase, the data driver continuously outputs a dark state voltage to each data line in the display panel. The dark state voltage is a voltage that enables sub-pixels to perform dark display, and the dark state voltage is greater than the power supply voltage.

With continued reference to FIG. 2, in the third phase, the voltage at the N2 node should be the power supply voltage VDD in theory, but the N2 node and the data line is weakly connected due to the leakage current at the first transistor T1, and thus the potential at the N2 node is changed by the influence of the dark state voltage transmitted on the data line. As a result, the output current of the driving transistor DT changes (increases or decreases). The potential at the N1 node and the potential at the N2 node both fluctuate, which causes the luminance of the light-emitting device L to be more unstable.

For example, in the case where the driving transistor DT is the P-type transistor, a decrease amplitude of the potential at the N1 node in the refresh period at the low refresh rate is greater than a decrease amplitude of the potential at the N1 node in the refresh period at the high refresh rate. For the N2 node, the higher the dark state voltage (and/or the longer a total duration of the electric leakage of the first transistor T1), the greater a rising amplitude of the potential at the N2 node. Therefore, the rising amplitude of the potential at the N2 node in the refresh period at the low refresh rate is greater than the rising amplitude of the potential at the N2 node in the refresh period at the high refresh rate. Since the refresh period corresponding to the high refresh rate is relatively short, the decrease amplitude of the gate-source voltage difference Vgs of the driving transistor DT in the refresh period is relatively small, and the luminance fluctuation of the light-emitting device L in the refresh period is also relatively small. However, since the refresh period corresponding to the low refresh rate is relatively long, the decrease amplitude of the gate-source voltage difference Vgs of the driving transistor DT in the refresh period is relatively large, and the luminance fluctuation of the light-emitting device L in the refresh period is relatively large, which results in a less desirable display effect.

For example, referring to FIG. 2, at least one (e.g., each) pixel circuit 100 further includes a parasitic capacitor C', and the parasitic capacitor C' is coupled to both the N2 node and the first electrode S4 of the fourth transistor T4. The parasitic capacitor C' helps maintain the stability of the potential at the N1 node. In combination with the description above, each holding frame includes a first holding phase, a second holding phase and a third holding phase. Since there is no new image frame signal written in the holding frame, the potential at the N1 node is reduced in the first holding phase due to the leakage current at the third transistor T3, thereby causing the luminance of the light-emitting device L to change. In the first holding phase and the second holding phase, the fourth transistor T4 is turned off, and theoretically, a voltage difference $|VDD-V_{N1}|$ ($V_{N1}$ being the voltage at the N1 node) exists between two electrode plates of the capacitor C, and a voltage difference $|VDD-V_{N2}|$ ($V_{N2}$ being the voltage at the N2 node) exists between two electrode plates of the parasitic capacitor C'. Since the leakage current exists at the first transistor T1, the voltage difference between the electrode plates of the parasitic capacitor C' changes with the change of the potential at the N2 node. In addition, the parasitic capacitor C' and the storage capacitor C affect each other. When the voltage difference between the electrode plates of the parasitic capacitor C' changes, the voltage difference between the electrode plates of the storage capacitor C also changes, and thus the potential at the N1 node changes. The potential at the N2 node is increased, and thus the voltage difference between the electrode plates of the parasitic capacitor C' is reduced; in this case, the voltage difference between the electrode plates of the storage capacitor C is reduced, so that the potential at the N1 node is reduced. The potential at the N2 node is reduced, and thus the voltage difference between the electrode plates of the parasitic capacitor C' is increased; in this case, the voltage difference between the electrode plates of the storage capacitor C is reduced, so that the potential at the N1 node is increased. Compared with a manner in which the same invalid signal is adopted at the high refresh rate and the low refresh rate, the voltage of the invalid signal is reduced at the low refresh rate in the embodiments of the present disclosure, so that the potential at the N2 node can be reduced in the first holding phase, and thus the voltage difference between the electrode plates of the parasitic capacitor C' is increased. As a result, the voltage difference between the electrode plates of the storage capacitor C is reduced, which pulls up the potential at the N1 node, and weakens the pull-down effect of the electric leakage of the third transistor T3 on the potential at the N1 node, thereby helping maintain the stability of the luminance of the light-emitting device at the low refresh rate.

The parasitic capacitor C' is subjected to different voltages of Vdata written in a porch interval to generate a fluctuation between different voltages, so that the voltage value of Cst also has a fluctuation, and the fluctuation may be controlled by the written voltage value of Vdata. Therefore, a luminance difference between two frames in which frequencies are switched may be compensated, thereby reducing the flicker problem at the low frequency.

In order to reduce the probability of the problems above and improve the display effect of the display apparatus, a method for driving the display apparatus is provided in some other embodiments of the present disclosure, and an executive body of the driving method may be the display apparatus described in any one of the embodiments of the present disclosure.

For example, each frame period includes a first phase, a second phase and a third phase; the frame period is divided into a writing frame (in which the image frame signal is output) and a holding frame (in which no image frame signal is output) according to whether the data driver outputs the image frame signal to the display panel in the frame period. For convenience of description, three phases included in the writing frame are referred to as a first writing phase, a second writing phase and a third writing phase, and three phases included in the holding frame are referred to as a first holding phase, a second holding phase and a third holding phase.

For example, each refresh period includes an effective phase and at least one ineffective phase (e.g., one or a plurality of ineffective phases). The effective phase includes a second refresh frame phase. An image frame signal corresponding to the refresh frame is output to the display panel in the effective phase. Each ineffective phase is one of a plurality of phases other than the second refresh frame phase in the refresh period. An ineffective data signal is output to the display panel in the ineffective phase, and a voltage of the ineffective data signal is the dark state voltage.

Figure 7A:
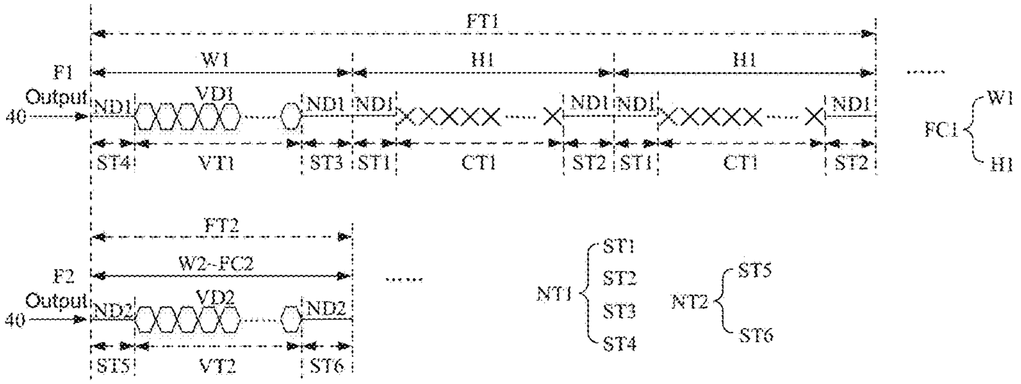
FIG. 7A is a schematic diagram illustrating an implementation of different refresh rates, in accordance with yet some other embodiments.
Figure 7B:
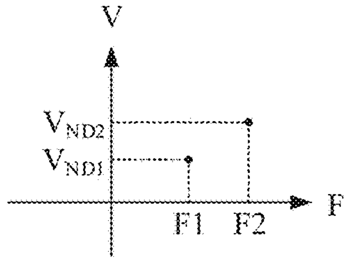
FIG. 7B is a diagram showing relationships of the different refresh rates and voltages of the different ineffective data signals at the different refresh rates in FIG. 7A in the case where a driver transistor of the pixel circuit in FIG. 2 is a P-type transistor.

For example, referring to FIG. 7A, a first refresh rate F1 and a second refresh rate F2 may be implemented by the display apparatus. The first refresh rate F1 corresponds to a first refresh period FT1, and the second refresh rate F2 corresponds to a second refresh period FT2. The first refresh rate F1 is different from the second refresh rate F2. Correspondingly, the first refresh period FT1 is different from the second refresh period FT2. The first refresh rate F1 is greater than the second refresh rate F2, or the first refresh rate F1 is less than the second refresh rate F2. As shown in FIG. 7B, in a case where the first refresh rate F1 is less than the second refresh rate F2, the first refresh period FT1 is greater than the second refresh period FT2, and vice versa. For simplicity, the following description is made by considering an example in which the first refresh rate F1 is less than the second refresh rate F2, the first refresh rate F1 is the low refresh rate, and the second refresh rate F2 is the high refresh rate.

Referring to FIG. 7A, the first refresh period FT1 includes a first effective phase VT1 and at least one first ineffective phase NT1 (e.g., one or a plurality of first ineffective phases NT1). A first image frame signal VD1 is output to the display panel in the first effective phase VT1, and a first ineffective data signal ND1 is output to the display panel in the first ineffective phase NT1. The second refresh period FT2 includes a second effective phase VT2 and at least one second ineffective phase NT2 (e.g., one or a plurality of second ineffective phases NT2). A second image frame signal VD2 is output to the display panel in the second effective phase VT2, and a second ineffective data signal ND2 is output to the display panel in the second ineffective phase NT2. The first effective phase VT1 included in the first refresh period FT1 may be equivalent to the second writing phase of the writing frame in the first refresh period FT1, and the second effective phase VT2 included in the second refresh period FT2 may be equivalent to the second writing phase of the writing frame in the second refresh period FT2.

For example, specific manners used to implement different refresh rates are not limited. The first refresh period FT1 may include only one frame period, or may include a plurality of frame periods; the second refresh period FT2 is the same. For example, the first refresh period includes only one first frame period, and the first frame period includes the first effective phase and at least one first ineffective phase (e.g., two first ineffective phases); the second refresh period includes only one second frame period, and the second frame period includes the second effective phase and at least one second ineffective phase (e.g., two second ineffective phases). As another example, referring to FIG. 7A, the first refresh period FT1 includes at least two (e.g., two) first frame periods FC1. In the first frame periods FC1, a first first frame period FC1 is a first writing frame W1, and other first frame period(s) FC1 are first holding frame(s) H1. The first writing frame W1 includes one first effective phase VT1, and the first refresh period FT1 includes six first ineffective phases VT1; the second refresh period FT2 includes only one second frame period FC2, and the second frame period F2 includes the second effective phase VT2 and two second ineffective phases NT2. As yet another example, referring to FIG. 8, the first refresh period FT1 includes one first writing frame W1 and at least one first holding frame H1 (e.g., two first holding frames H1); the first writing frame W1 includes one first effective phase VT1, and the first refresh period FT1 includes six first ineffective phases VT1. The second refresh period FT2 includes at least two (e.g., two) second frame periods FC2; in the second frame periods FC2, a first second frame period is a second writing frame W2, and other second frame period(s) are second holding frame(s) H2. The second writing frame W2 includes the second effective phase V2, and the second refresh period FT2 includes four second ineffective phases NT2. In this case, the number of second frame periods FC2 included in the second refresh period FT2 is less than the number of first frame periods FC1 included in the first refresh period FT1.

Further, voltages of the first ineffective data signal ND1 and the second ineffective data signal ND2 are set to be different. Relative magnitudes of the voltages of the first ineffective data signal ND1 and the second ineffective data signal ND2 may be set according to relative magnitudes of the first refresh rate F1 and the second refresh rate F2, and whether the driving transistor of the pixel circuit is the P-type transistor or the N-type transistor, so that a variation degree of the output current of the driving transistor is relatively small in the first ineffective phase NT1, and correspondingly, an overall variation degree of the output current of the driving transistor is also relatively small in the first refresh period FT1. As a result, it helps improve the display effect at the first refresh rate F1 (i.e., the low refresh rate).

For example, referring to FIGS. 2, 7A and 7B, in the case where the driving transistor is the P-type transistor, the first refresh rate F1 is less than the second refresh rate F2, and a voltage $V_{ND1}$ of the first ineffective data signal ND1 at the first refresh rate F1 is less than a voltage $V_{ND2}$ of the second ineffective data signal ND2 at the second refresh rate F2. Since the first refresh period F1 has been determined, and the structure of the pixel circuit has also been determined, the decrease amplitude of the potential at the N1 node in the first refresh period F1 is determined accordingly. For the N2 node, the first refresh period F1 has been determined, and thus the variation amplitude of the potential at the N2 node can only be changed by changing the voltage $V_{ND1}$ of the first ineffective data signal ND1. In general, the voltage of the first ineffective data signal ND1 is equal to the voltage of the second ineffective data signal ND2. Therefore, in order to reduce the variation amplitude of the potential at the N2 node, the voltage $V_{ND1}$ of the first ineffective data signal ND1 is set to be less than the voltage $V_{ND2}$ of the second ineffective data signal ND2 in the embodiments of the present disclosure. The voltage $V_{ND1}$ of the first ineffective data signal ND1 is reduced, and thus the variation amplitude of the potential at the N2 node is reduced. As a result, the decrease amplitude of the gate-source voltage difference Vgs of the driving transistor DT can be reduced in the first refresh period F1, which reduces the increase amplitude of the output current of the driving transistor DT accordingly, thereby ameliorating the display flicker and improving the display effect at the low frequency.

Figure 8:
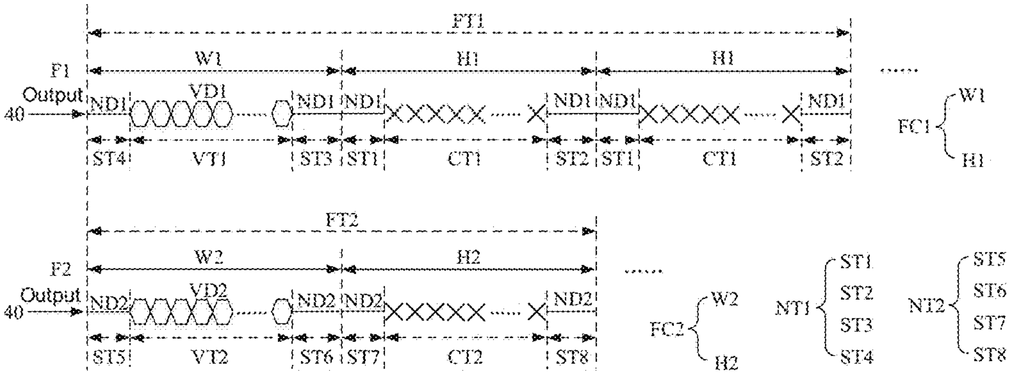
FIG. 8 is a schematic diagram illustrating an implementation of different refresh rates, in accordance with yet some other embodiments.

For example, referring to FIGS. 7A and 8, the first refresh period FT1 includes one first writing frame W1 and at least one first holding frame H1 (e.g., two first holding frames H1). Each first holding frame H1 includes a first display control phase CT1 and a first free phase ST1, a position of the first display control phase CT1 in the first holding frame H1 is the same as a position of the first effective phase VT1 in the first writing frame W1; the first free phase ST1 is between the first display control phase CT1 and the first writing frame W1, and the first free phase ST1 is one of the at least one first ineffective phase NT1. In combination with the description above, each holding frame includes a first holding phase, a second holding phase and a third holding phase. For the first holding frame H1, the first display control phase CT1 included in the first holding frame H1 may be equivalent to a second holding phase of one holding frame, and the first free phase ST1 included in the first holding frame H1 may be equivalent to a first holding phase of one holding frame; each first free phase ST1 is a first ineffective phase NT1. In the first refresh period FT1, due to the electric leakage, the output current of the driving transistor in each pixel circuit starts to change from a moment where the first effective phase VT1 of the first writing frame W1 ends, and the variation degree of the output current is continuously increased in each first holding frame H1 included in the first refresh period FT1, and the first ineffective data signal ND1 is output to the display panel in the first free phase ST1, so that the variation degree of the output current of the driving transistor in the phase can be reduced. As a result, it helps reduce the display flicker in the entire first refresh period FT1.

For example, referring to FIGS. 7A and 8, the first ineffective data signal ND1 may be output to the display panel in the first display control phase CT1 of the first holding frame H1. The first ineffective data signal ND1 with a constant voltage is output to the display panel in the first display control phase CT1, and thus there is no need to output a pixel voltage required by each pixel circuit to the pixel circuit, and a frequency of the data driver outputting signals is reduced. As a result, it helps reduce the power consumption of the data driver. Correspondingly, it helps reduce the overall power consumption of the display apparatus. As another example, a high impedance state may be output to the display panel in the first display control phase CT1 of the first holding frame H1, which is equivalent to making an open circuit between each data line in the display panel and the data driver. Compared with outputting the pixel voltage required by each pixel circuit to the pixel circuit, this arrangement also helps reduce the power consumption of the display apparatus.

For example, referring to FIGS. 7A and 8, the first holding frame H1 further includes a second free phase ST2. The second free phase ST2 is after the first display control phase CT1, and the second free phase ST2 is one of the at least one first ineffective phase NT1. The second free phase ST2 included in the first holding frame H1 may be equivalent to the third holding phase of the holding frame, and the first ineffective data signal ND1 is output to the display panel in the phase, which also helps improve the display effect of the first refresh period FT1.

For example, referring to FIGS. 7A and 8, the first writing frame W1 further includes a third free phase ST3. The third free phase ST3 is between the first effective phase VT1 and the first holding frame H1, and the third free phase ST3 is one of the at least one first ineffective phase NT1. The third free phase ST3 included in the first writing frame W1 may be equivalent to the third writing phase of the writing frame. The output current of the driving transistor starts to change in the phase due to the leakage current at the first transistor, and therefore, the first ineffective data signal ND1 is output to the display panel in the third free phase ST3, which can also ameliorate the display flicker in the first refresh period FT1.

For example, referring to FIGS. 7A and 8, the first writing frame W1 further includes a fourth free phase ST4. The fourth free phase ST4 is before the first effective phase VT1, and the fourth free phase ST4 is one of the at least one first ineffective phase NT1. The fourth free phase ST4 included in the first writing frame W1 may be equivalent to the first writing phase of the writing frame.

Figure 9:
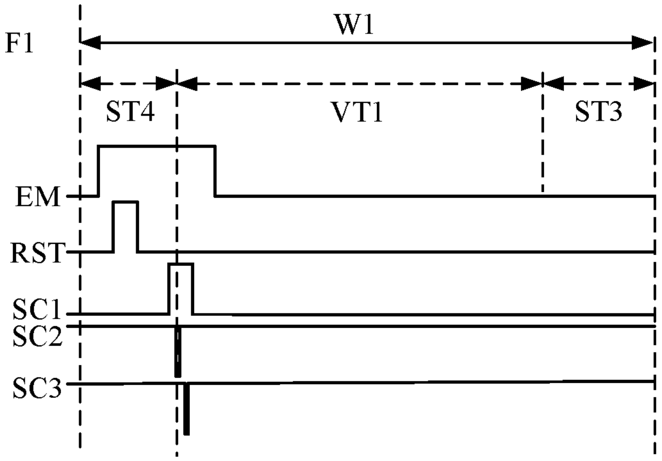
FIG. 9 is a driving timing diagram of sub-pixels in a row in a writing frame, in accordance with some embodiments.

For example, referring to FIGS. 7A, 8 and 9, in the fourth free phase ST4 of the first writing frame W1, the reset scan signal RST is output to the row of sub-pixels in the display panel; in the first effective phase VT1 of the first writing frame W1, an effective voltage of the first scan signal SC1 is output to the row of sub-pixels in the display panel, and effective voltages corresponding to the second scan signal SC2 and the third scan signal SC3 are output to the display panel in sequence. A phase in which the second scan signal SC2 is at an effective voltage and a phase in which the third scan signal SC3 is at an effective voltage are both within a phase in which the first scan signal SC1 is at an effective voltage.

Figure 10:
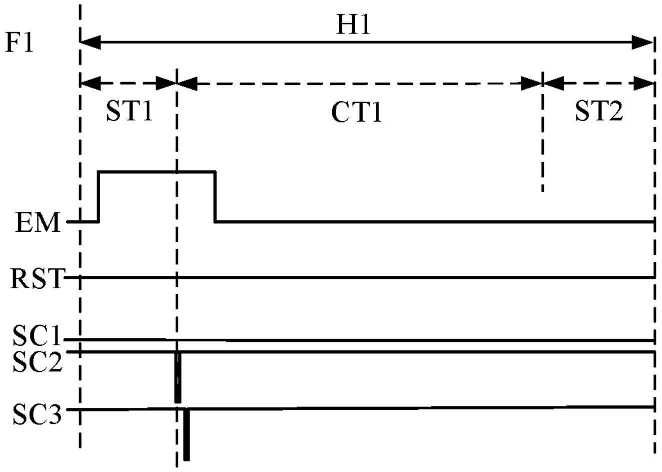
FIG. 10 is a driving timing diagram of sub-pixels in a row in a holding frame, in accordance with some embodiments.

Referring to FIGS. 8 and 10, in the first free phase ST1 of the first holding frame H1, no reset scan signal RST is output to the display panel, and the first transistor in each pixel circuit is not turned on, so that the potential at the N1 node is not reset. As a result, the light-emitting device continues to emit light in the first holding frame H1. In the first free phase ST1, the effective voltage of the first scan signal SC1 is not output, but the effective voltages corresponding to the second scan signal SC2 and the third scan signal SC3 are output to the row of sub-pixels in the display panel in sequence, which is equivalent to reducing the output frequency of the first scan signal SC1, thereby helping reduce the power consumption of the scan driver. As a result, the overall power consumption of the display apparatus is reduced.

An arrangement of the second refresh period FT2 is similar to the arrangement of the first refresh period FT1. For example, referring to FIG. 7A, the second refresh period FT2 includes only one second frame period FC2. The second frame period FC2 includes a fifth free phase ST5 and a sixth free phase ST6, in addition to the second effective phase VT2. The fifth free phase ST5 is before the second effective phase VT2, and the sixth free phase ST6 is after the second effective phase VT2. The fifth free phase ST5 is one of the at least one second ineffective phase NT2, and the sixth free phase ST6 is also one of the at least one second ineffective phase NT2.

As another example, referring to FIG. 8, the second refresh period FT2 includes one second writing frame W2 and at least one (e.g., one) second holding frame H2. The second writing frame W2 includes the second effective phase VT2, and further includes a fifth free phase ST5 before the second effective phase VT2, and a sixth free phase ST6 after the second effective phase VT2. The fifth free phase ST5 is one of the at least one second ineffective phase NT2, and the sixth free phase ST6 is also one of the at least one second ineffective phase NT2. Each second holding frame H2 includes a second display control phase CT2, and the second display control phase CT2 may be equivalent to a second holding phase of one holding frame. The second holding frame H2 further includes a seventh free phase ST7 and an eighth free phase ST8. The seventh free phase ST7 is before the second display control phase CT2, and the eighth free phase ST8 is after the second display control phase CT2. The seventh free phase ST7 is one of the at least one second ineffective phase NT2, and the eighth free phase ST8 is also one of the at least one second ineffective phase NT2.

Referring to FIG. 2, considering an example in which the driving transistor DT is the P-type transistor, in one refresh period, the electric leakage of the third transistor T3 causes the potential at the N1 node to decrease, and the greater the refresh period, the greater the decrease amplitude of the potential at the N1 node. A decrease amplitude of the potential at the N1 node at the low refresh rate is greater than a decrease amplitude of the potential at the N1 node at the high refresh rate, and the greater an absolute value of a difference between refresh rates at the low refresh rate and the high refresh rate, the greater a difference between the decrease amplitude of the potential at the N1 node at the low refresh rate and the decrease amplitude of the potential at the N1 node at the high refresh rate. In addition, the electric leakage of the first transistor T1 causes the potential at the N2 node to be pulled up due to an influence of the ineffective data signal, and the greater the refresh period, the greater a rising amplitude of the potential at the N2 node. A rising amplitude of the potential at the N2 node at the low refresh rate is greater than a rising amplitude of the potential at the N2 node at the high refresh rate, and the greater the absolute value of the difference between the refresh rates at the low refresh rate and the high refresh rate, the greater a difference between the rising amplitude of the potential at the N2 node at the low refresh rate and the rising amplitude of the potential at the N2 node at the high refresh rate. When the potential at the N1 node is decreased, the potential at the N2 node is increased, which causes the decrease amplitude of the gate-source voltage difference Vgs of the driving transistor to be greater. In combination with the description above, the decrease amplitude of the gate-source voltage difference Vgs at the low refresh rate is greater than the decrease amplitude of the gate-source voltage difference Vgs at the high refresh rate, which aggravates the display flicker. As a result, the display effect is less ideal.

In order to avoid the problems, the display apparatus provided in embodiments of the present disclosure can implement at least three (e.g., various) different refresh rates, and the different refresh rates include a first refresh rate and a second refresh rate. An absolute value of a voltage difference between the first ineffective data signal and the second ineffective data signal is positively correlated with an absolute value of a difference between the first refresh rate and the second refresh rate. The greater the absolute value of the difference between the first refresh rate and the second refresh rate, the greater the absolute value of the voltage difference between the first ineffective data signal and the second ineffective data signal, and vice versa. Referring to FIG. 2, considering an example in which the driving transistor DT is the P-type transistor, the less the voltage value of the ineffective data signal corresponding to the low refresh rate, the less the rising amplitude of the potential at the N2 node. In a case where the decrease amplitude of the potential at the N1 node cannot be changed, by decreasing the rising amplitude of the potential at the N2 node, it is possible to maintain the variation amplitude of the gate-source voltage difference Vgs of the driving transistor DT as small as possible, thereby helping alleviate the display flicker.

For example, the driving transistor is the P-type transistor, and the display apparatus has four refresh rates of 120 Hz, 90 Hz, 60 Hz and 30 Hz. A voltage of an ineffective data signal corresponding to 120 Hz is maximum, and may be 6.8 V; a voltage of an ineffective data signal voltage corresponding to 90 Hz may be 6.7 V; a voltage of an ineffective data signal voltage corresponding to 60 Hz may be 6.7 V, and a voltage of an ineffective data signal voltage corresponding to 30 Hz may be 6.6 V.

The driving method in any one of the embodiments described above may be applied to the display apparatus DP provided in embodiments of the present disclosure, thereby generating same beneficial effects as the corresponding driving method. For example, referring to FIGS. 1 and 8, the first refresh rate F1 corresponds to the first refresh period FT1, and the first refresh period FT1 includes one first effective phase VT1 and at least one first ineffective phase NT1 (e.g., the plurality of first ineffective phases NT1); the second refresh rate F2 corresponds to the second refresh period FT2, and the second refresh period FT2 includes one second effective phase V2 and at least one second ineffective phase NT2 (e.g., the plurality of second ineffective phases NT2). The data driver 20 of the display apparatus DP is configured to output the first image frame signal VD1 to the display panel 10 in the first effective phase VT1, and output the first ineffective data signal ND1 to the display panel 10 in at least one (e.g., each) first ineffective phase NT1. The data driver 20 is further configured to output the second image frame signal VD2 to the display panel 10 in each second effective phase VT2, and output the second ineffective data signal ND2 to the display panel 10 in at least one (e.g., each) second ineffective phase NT2. The first refresh rate F1 is different from the second refresh rate F2, and voltages of the first ineffective data signal ND1 and the second ineffective data signal ND2 are different. Thus, it is possible to enable the variation degree of the output current of the driving transistor to be relatively small in the first ineffective phase NT1. Correspondingly, the overall variation degree of the output current of the driving transistor in the refresh period is also small, which helps improve the display effect at the low refresh rate.

For example, the first refresh rate F1 is less than the second refresh rate F2, the first refresh period FT1 includes one first writing frame W1 and at least one first holding frame H1 (e.g., one or a plurality of first holding frames H1). The first holding frame H1 includes a first display control phase CT1 and a first free phase ST1, a position of the first display control phase CT1 in the first holding frame H1 is the same as a position of the first effective phase V1 in the first writing frame W1. The first free phase ST1 is located between the first display control phase CT1 and the first writing frame W1, and the first free phase ST1 is one of the plurality of first ineffective phases NT1. In this case, the scan driver 30 in the display apparatus DP is configured to: in the first effective phase VT1, output a first scan signal to a row of sub-pixels in the display panel 10 and output a second scan signal and a third scan signal to the row of sub-pixels in sequence. A phase in which the second scan signal is at an effective voltage and a phase in which the third scan signal is at an effective voltage are both within a phase in which the first scan signal is at an effective voltage. The scan driver 30 in the display apparatus DP is further configured to, in the first free phase ST1, do not output the effective voltage of the first scan signal to the display panel 10, but output the effective voltages corresponding to the second scan signal and the third scan signal to the row of sub-pixels in the display panel 10 in sequence, which is equivalent to reducing the output frequency of the first scan signal SC1, thereby helping reduce the power consumption of the scan driver. As a result, the overall power consumption of the display apparatus is reduced.

Figure 11:
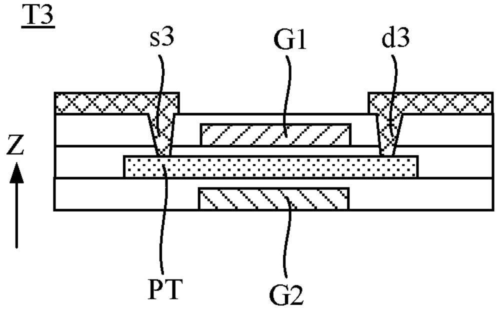
FIG. 11 is a structural diagram of a dual-gate transistor, in accordance with some embodiments.

For example, the third transistor may be a dual-gate transistor, and the third transistor includes an active pattern, a first gate, and a second gate that are insulated from each other. A specific form of the dual-gate transistor is not limited in the present disclosure. For example, the first gate and the second gate of the third transistor are both located on a same side of the active pattern layer in a thickness direction of the display apparatus, and the first gate and the second gate may be arranged in a same layer. As another example, referring to FIG. 11, the third transistor may have both a top-gate structure and a bottom-gate structure; the first gate G1 and the second gate G2 of the third transistor T3 are located on different sides of the active pattern PT in the thickness direction Z of the display apparatus. The first gate G1 is located on a side of the active pattern PT proximate to a light exit surface (i.e., a surface where the user can observe a display image) of the display apparatus, and in this case, the third transistor has the top-gate structure; the second gate G2 is located on a side of the active pattern PT away from the light exit surface of the display apparatus, and in this case, the third transistor has the bottom-gate structure. An insulating layer is arranged between any two of the active pattern PT, the first gate G1 and the second gate G2. Compared with a single-gate transistor, the third transistor T3 is set to be the dual-gate transistor, which has higher stability, and the first gate G1 and the second gate G2 can shield light irradiated onto the active pattern PT, thereby helping reduce or eliminate leakage current at the third transistor T3. The smaller the leakage current at the third transistor T3 is, the better the reduction of the refresh rate is facilitated. In addition, the luminance of the light-emitting device can be well maintained in the light-emitting phase, which is also beneficial to the improvement of the display effect. Similar to the third transistor, the second transistor may also be a dual-gate transistor. In the case where the second transistor is the dual-gate transistor, a structure of the second transistor may be set with reference to the structure of the third transistor, which will not be repeated here.

It will be noted that, for clarity and brevity, the embodiments of the present disclosure do not describe all the constituent units of the display apparatus. In order to achieve the necessary functions of the display apparatus, those skilled in the art can provide and arrange other components not shown according to specific needs, which is not limited in the embodiments of the present disclosure.

Some embodiments of the present disclosure provide a computer-readable storage medium (e.g., a non-transitory computer-readable storage medium), the computer-readable storage medium stores therein computer program instructions that, when run on a processor, cause a computer (e.g., the display apparatus) to perform the method for driving the display apparatus according to any one of the embodiments above.

For example, the computer-readable storage medium may include, but is not limited to, a magnetic storage device (e.g., a hard disk, a floppy disk or a magnetic tape), an optical disk ((e.g., a compact disk (CD), a digital versatile disk (DVD)), a smart card and a flash memory device (e.g., an erasable programmable read-only memory (EPROM), a card, a stick or a key driver). Various computer-readable storage media described in the present disclosure may represent one or more devices and/or other machine-readable storage media, which are used for storing information. The term "machine-readable storage media" may include, but is not limited to, wireless channels and various other media capable of storing, containing and/or carrying instructions and/or data.

Some embodiments of the present disclosure provide a computer program product. The computer program product includes computer program instructions that, when run on a computer, cause the computer to perform the method for driving the display apparatus according to any one of the embodiments above.

Some embodiments of the present disclosure provide a computer program. When the computer program is executed on the computer, the computer program causes the computer to perform the method for driving the display apparatus according to any one of the embodiments above.

Beneficial effects of the computer-readable storage medium, the computer program product, and the computer program are the same as the beneficial effects of the method for driving the display apparatus described in the embodiments above, and will not be repeated here.

The above are only specific embodiments of the present disclosure, but the scope of protection of the present disclosure is not limited thereto, and any person skilled in the art may conceive of variations or replacements within the technical scope of the present disclosure, which shall fall within the protection scope of the present disclosure. Therefore, the protection scope of the present disclosure should be determined by the protection scope of the claims.

What is claimed is:

1. A method for driving a display apparatus, the method comprising:

in a first refresh period that corresponds to a first refresh rate and includes a first effective phase and at least one first ineffective phase, outputting a first image frame signal to a display panel of the display apparatus in the first effective phase, and outputting a first ineffective data signal to the display panel in a first ineffective phase; and in a second refresh period that corresponds to a second refresh rate and includes a second effective phase and at least one second ineffective phase, outputting a second image frame signal to the display panel in the second effective phase, and outputting a second ineffective data signal to the display panel in a second ineffective phase;

wherein the first refresh rate is different from the second refresh rate, and the first ineffective data signal and the second ineffective data signal have different magnitudes in voltage;

wherein the first refresh rate is less than the second refresh rate;

the first refresh period includes at least two first frame periods, a first first frame period in the at least two first frame periods is a first writing frame, and each first frame period in the at least two first frame periods other than the first writing frame is a first holding frame;

the first effective phase is included in the first writing frame; and the first holding frame includes a first display control phase and a first free phase, a position of the first display control phase in the first holding frame and a position of the first effective phase in the first writing frame are same; the first free phase is between the first display control phase and the first writing frame, and the first free phase is one of the at least one first ineffective phase.

2. The method for driving the display apparatus according to claim 1, wherein the first ineffective data signal is output to the display panel in the first display control phase.

3. The method for driving the display apparatus according to claim 1, wherein a high impedance state is output to the display panel in the first display control phase.

4. The method for driving the display apparatus according to claim 1, wherein the first holding frame further includes a second free phase, the second free phase is after the first display control phase, and the second free phase is one of the at least one first ineffective phase.

5. The method for driving the display apparatus according to claim 1, wherein the first writing frame further includes a third free phase, the third free phase is between the first effective phase and the first holding frame, and the third free phase is one of the at least one first ineffective phase.

6. The method for driving the display apparatus according to claim 1, further comprising:

in the first effective phase, outputting a first scan signal to a row of sub-pixels in the display panel, and outputting a second scan signal and a third scan signal to the row of sub-pixels in the display panel in sequence; a phase in which the second scan signal is at an effective voltage and a phase in which the third scan signal is at an effective voltage being both within a phase in which the first scan signal is at an effective voltage; and in the first free phase, outputting the second scan signal and the third scan signal to the row of sub-pixels in the display panel in sequence.

7. The method for driving the display apparatus according to claim 1, wherein the second refresh period includes at least two second frame periods, and a first second frame period in the at least two second frame periods is a second writing frame;

the second effective phase is included in the second writing frame.

8. The method for driving the display apparatus according to claim 7, wherein the second writing frame further includes a fifth free phase and a sixth free phase; the fifth free phase is before the second effective phase, and the sixth free phase is after the second effective phase; the fifth free phase is one of the at least one second ineffective phase, and the sixth free phase is also one of the at least one second ineffective phase;

each second frame period in the at least two second frame periods other than the second writing frame is a second holding frame;

the second holding frame includes a second display control phase, a seventh free phase and an eighth free phase; the second display control phase is between the seventh free phase and the eighth free phase; the seventh free phase is one of the at least one second ineffective phase, and the eighth free phase is also one of the at least one second ineffective phase.

9. The method for driving the display apparatus according to claim 1, wherein the second refresh period includes one second frame period.

10. The method for driving the display apparatus according to claim 1, wherein the display apparatus includes at least three different refresh rates, the first refresh rate and the second refresh rate are included in the at least three different refresh rates;

an absolute value of a difference between a voltage of the first ineffective data signal and a voltage of the second ineffective data signal is positively correlated with an absolute value of a difference between the first refresh rate and the second refresh rate.

11. The method for driving the display apparatus according to claim 1, wherein a voltage of the first ineffective data signal is less than a voltage of the second ineffective data signal.

12. The method for driving the display apparatus according to claim 1, wherein the first writing frame further includes a fourth free phase, the fourth free phase is before the first effective phase, and the fourth free phase is one of the at least one first ineffective phase.

13. The method for driving the display apparatus according to claim 12, further comprising:

in the fourth free phase, outputting a reset scan signal to a row of sub-pixels in the display panel; and in the first effective phase, outputting an effective voltage of a first scan signal to the row of sub-pixels in the display panel, and outputting effective voltages corresponding to a second scan signal and a third scan signal to the row of sub-pixels in the display panel in sequence; a phase in which the second scan signal is at an effective voltage and a phase in which the third scan signal is at an effective voltage being both within a phase in which the first scan signal is at an effective voltage.

14. A display apparatus, comprising:

a display panel configured to display an image frame; and a data driver, wherein the data driver is configured to:

in a first refresh period that corresponds to a first refresh rate and includes a first effective phase and at least one first ineffective phase, output a first image frame signal to the display panel in the first effective phase, and output a first ineffective data signal to the display panel in a first ineffective phase; and in a second refresh period that corresponds to a second refresh rate and includes a second effective phase and at least one second ineffective phase, output a second image frame signal to the display panel in the second effective phase, and output a second ineffective data signal to the display panel in a second ineffective phase;

wherein the first refresh rate is different from the second refresh rate, and the first ineffective data signal and the second ineffective data signal have different magnitudes in voltage;

wherein the first refresh rate is less than the second refresh rate, the first refresh period includes at least two first frame periods, a first first frame period in the at least two first frame periods is a first writing frame, and the first effective phase is included in the first writing frame; each first frame period in the at least two first frame periods other than the first writing frame is a first holding frame, the first holding frame includes a first display control phase and a first free phase, a position of the first display control phase in the first holding frame and a position of the first effective phase in the first writing frame are same; the first free phase is located between the first display control phase and the first writing frame, and the first free phase is one of the at least one first ineffective phase; and the display apparatus further comprises:

a scan driver, wherein the scan driver is configured to:

in the first effective phase, output a first scan signal to a row of sub-pixels in the display panel, and output a second scan signal and a third scan signal to the row of sub-pixels in the display panel in sequence; a phase in which the second scan signal is at an effective voltage and a phase in which the third scan signal is at an effective voltage are both within a phase in which the first scan signal is at an effective voltage; and in the first free phase, output the second scan signal and the third scan signal to the row of sub-pixels in the display panel in sequence.

15. The display apparatus according to claim 14, wherein the display panel includes a plurality of data lines and a plurality of pixel circuits, and a data line in the plurality of data lines is coupled to both the data driver and a pixel circuit in the plurality of pixel circuits;

the pixel circuit includes a plurality of transistors, the plurality of transistors include a driving transistor and a first transistor, and the first transistor is coupled to both the data line and the driving transistor; and the first transistor is a low-temperature polysilicon transistor.

16. The display apparatus according to claim 15, wherein each transistor includes a control electrode, a first electrode and a second electrode, and the first electrode and the second electrode are connected under control of the control electrode;

the plurality of transistors further include a second transistor and a third transistor; a first electrode and a second electrode of the second transistor are both connected to the driving transistor, and the third transistor is connected to both a control electrode of the driving transistor and the second transistor; and the third transistor is an oxide transistor.

17. The display apparatus according to claim 16, wherein the third transistor includes an active pattern, and further includes a first gate and a second gate;

the first gate and the second gate are located on different sides of the active pattern in a thickness direction of the display apparatus, and are both insulated from the active pattern.

18. A method for driving a display apparatus, the method comprising:

in a first refresh period that corresponds to a first refresh rate and includes a first effective phase and at least one first ineffective phase, outputting a first image frame signal to a display panel of the display apparatus in the first effective phase, and outputting a first ineffective data signal to the display panel in a first ineffective phase; and in a second refresh period that corresponds to a second refresh rate and includes a second effective phase and at least one second ineffective phase, outputting a second image frame signal to the display panel in the second effective phase, and outputting a second ineffective data signal to the display panel in a second ineffective phase;

wherein the first refresh rate is different from the second refresh rate, and the first ineffective data signal and the second ineffective data signal have different magnitudes in voltage;

wherein the second refresh period includes at least two second frame periods, a first second frame period in the at least two second frame periods is a second writing frame, and each second frame period in the at least two second frame periods other than the second writing frame is a second holding frame;

the second effective phase is included in the second writing frame;

the second writing frame further includes a fifth free phase and a sixth free phase; the fifth free phase is before the second effective phase, and the sixth free phase is after the second effective phase; the fifth free phase is one of the at least one second ineffective phase, and the sixth free phase is also one of the at least one second ineffective phase; and the second holding frame includes a second display control phase, a seventh free phase and an eighth free phase; the second display control phase is between the seventh free phase and the eighth free phase; the seventh free phase is one of the at least one second ineffective phase, and the eighth free phase is also one of the at least one second ineffective phase.

* * * * *